M. J. BARR.
Improvement in Cultivators.

No. 124,316. Patented March 5, 1872.

Witnesses.
Villette Anderson
E H Bates

Inventor.
M. J. Barr,
Chipman Hosmer & Co
Attys.

124,316

UNITED STATES PATENT OFFICE.

MARION J. BARR, OF CENTREVILLE, INDIANA.

IMPROVEMENT IN CULTIVATORS.

Specification forming part of Letters Patent No. 124,316, dated March 5, 1872.

*To all whom it may concern:*

Be it known that I, M. J. BARR, of Centreville, in the county of Wayne and State of Indiana, have invented a new and valuable Improvement in Corn-Plows; and I do hereby declare that the following is a full, clear, and exact description of the construction and operation of the same, reference being had to the annexed drawing making a part of this specification and to the letters and figures of reference marked thereon.

Figure 1:
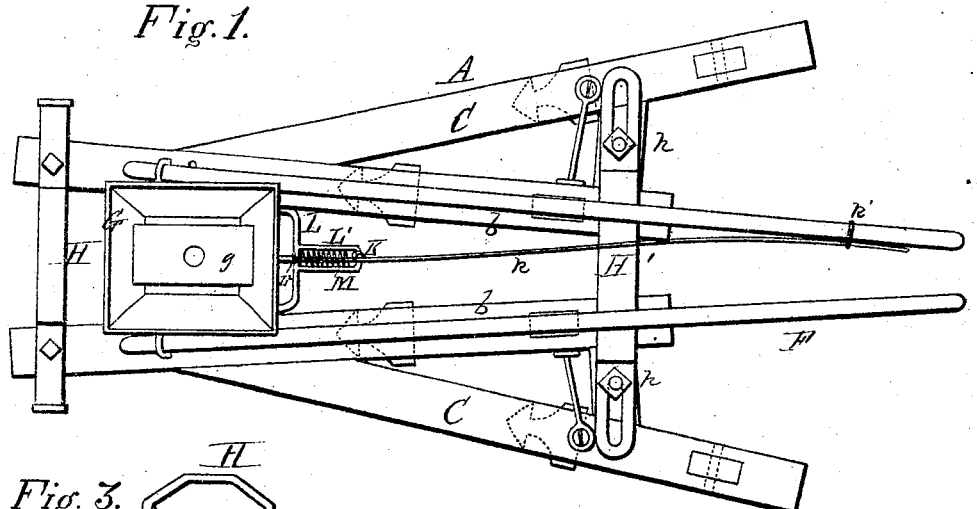
Figure 3:
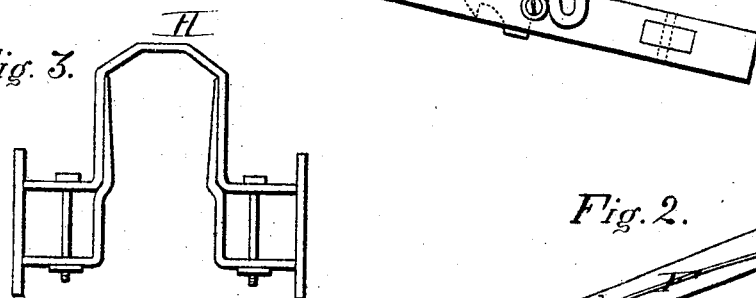
Figure 2:
Figure 2:
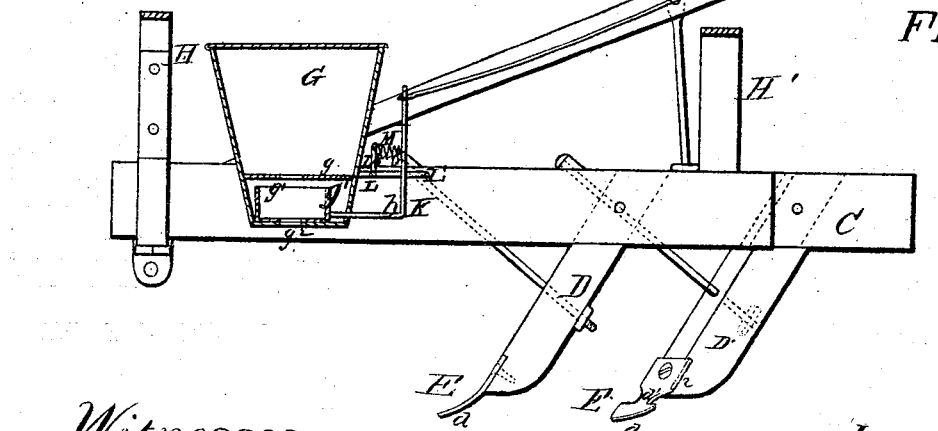
Figure 4:
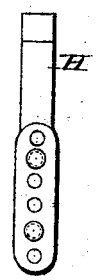

Figure 1 of the drawing is a representation of a plan view of my improved corn-plow. Fig. 2 is a vertical longitudinal section of the same. Fig. 3 is a front elevation of arched clevis-iron. Fig. 4 is side view of arched clevis-iron.

This invention has relation to corn-plows and planters; and the novelty consists in the construction and arrangement of the seeding mechanism, and also of the shovels, so that they may do the work of subsoiling and surface plowing at the same time.

Referring to the drawing, A represents the frame of a corn-plow, marker, and planter, composed of the longitudinal beams $b$ and oblique beams C, to which are secured the removable standards D D', furnished with shovels E. F represents the handles attached to the beams $b$. H represents the double-arched clevis-iron hinged to the beams $b$. H' represents a slotted arched brace secured to the sides of the frame A in an adjustable manner by bolts $h$, allowing the width of the implement to be varied. The standards D may be removed in order to adapt the implement to use as a corn-marker, and replaced, and the standards D' removed to adapt it to use as a corn-plow. The shovels are constructed with barbed or shouldered points $d$ to serve as subsoilers, and have narrow shanks or necks $d^1$ connecting them with the beveled plow parts $d^2$, as shown in the drawing. The shoulders of the barbed point are made horizontal, and from their inner ends the lower edges of the surface-plow run in concave lines upward and outward to the side edges of the same. The neck $d^1$, therefore, is beveled downward and inward to the subsoil point. G represents a seed-hopper arranged between the beams $b$, near their forward ends, and secured to the right-hand beam alone to allow the beams to be adjusted. A perforated partition, $g$, divides the hopper into two parts, in the lower of which a seed-slide or cup, $g^1$, vibrates, depositing at intervals the corn on the earth through corresponding openings $g^2$ in the slide and bottom of the hopper. To one end of the seed-slide a bent arm, K, is attached, and to this arm an operating-rod, $k$, is connected and extends back toward the rear end of the implement, as shown in the drawing, being supported beside one of the handles F by means of a ring, $k'$. A bracket or stirrup, L, projects from the back part of the hopper, and is constructed with a loop, L', which guides the arm K. It is also constructed with a stud, L$^2$, to which the arm K is connected by a spring, M. The spring M operates the slide in one direction to open the seed apertures $g^2$.

The location of the seed-hopper is forward of the shovels, attached to the middle beams, and the work of depositing seed in a middle furrow is accomplished while the plows on either side are forming other furrows.

What I claim as my invention, and desire to secure by Letters Patent, is—

The combined subsoiler and surface-plow E, having the bushed or shouldered point $d$, neck $d^1$, and beveled surface-plate $d^2$, constructed substantially as and for the purpose specified.

In testimony that I claim the above I have hereunto subscribed my name in the presence of two witnesses.

MARION J. BARR.

Witnesses:
 WILLIAM H. DEMOSS,
 H. F. BAKER.